INVENTOR.
AMOS O. PAYNE.
BY
WILSON, SETTLE & BATCHELDER.
ATT'YS.

Aug. 12, 1969   A. O. PAYNE   3,460,399
CONTROL MECHANISM FOR VARIABLE RATIO DRIVE
Filed Oct. 25, 1967   3 Sheets-Sheet 2

INVENTOR.
AMOS O. PAYNE.
BY
WILSON, SETTLE & BATCHELDER.
ATT'YS.

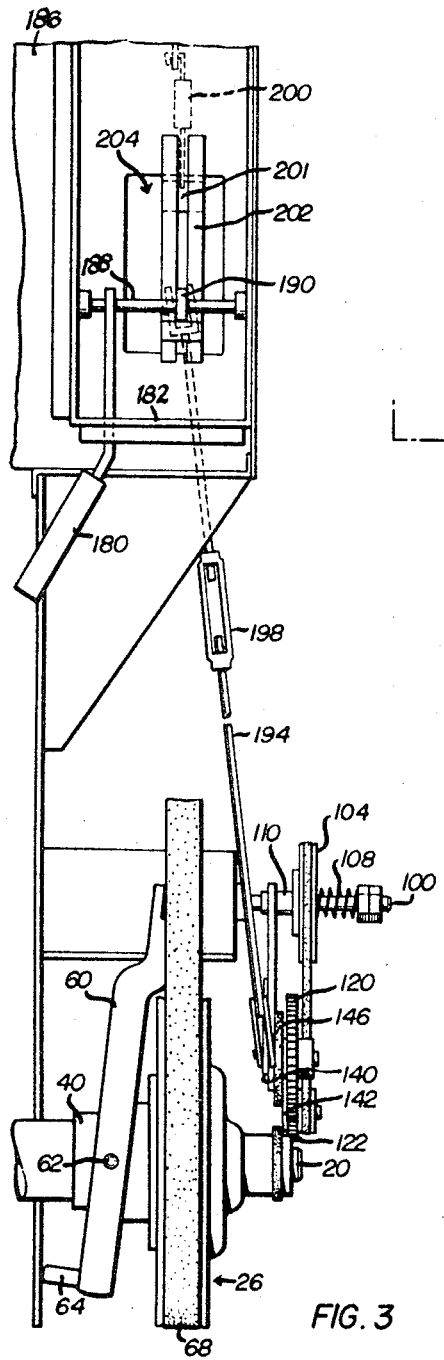
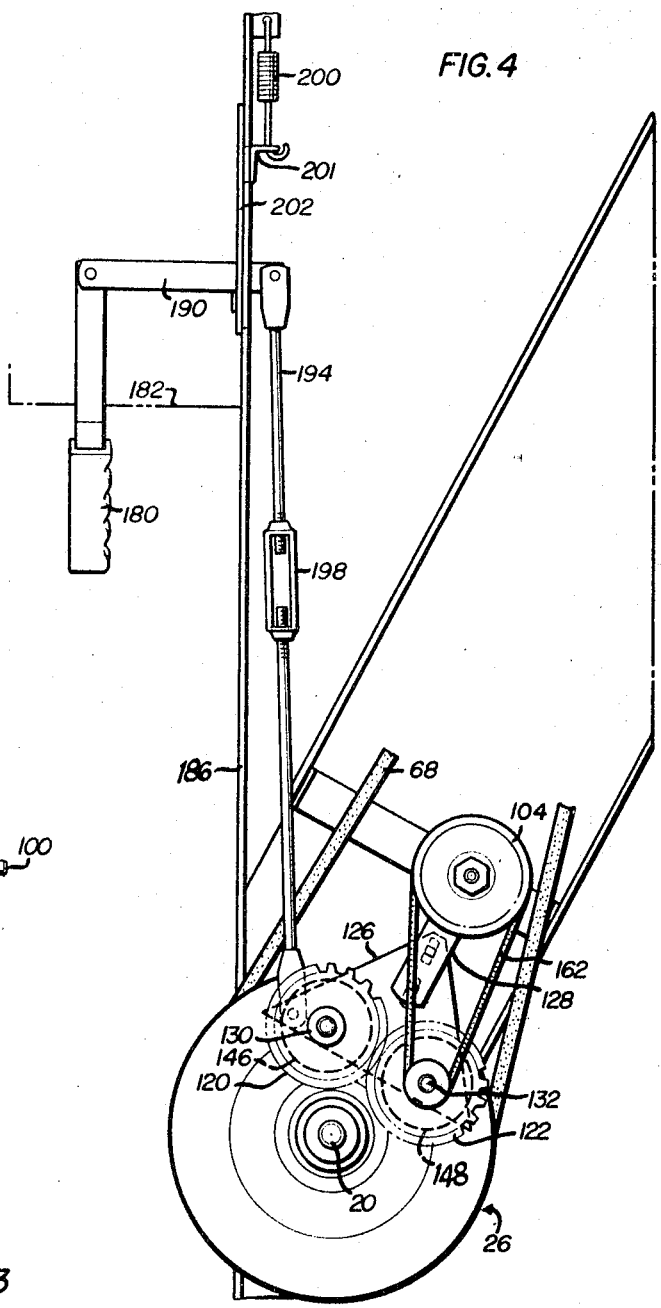
FIG. 4
FIG. 3

United States Patent Office 3,460,399
Patented Aug. 12, 1969

3,460,399
CONTROL MECHANISM FOR VARIABLE RATIO DRIVE
Amos O. Payne, Eldridge, Iowa, assignor to J. I. Case Company, Racine, Wis., a corporation of Wisconsin
Filed Oct. 25, 1967, Ser. No. 678,008
Int. Cl. F16h 55/56
U.S. Cl. 74—230.17                                13 Claims

ABSTRACT OF THE DISCLOSURE

A control mechanism for a variable ratio drive is provided for a work device, such as a farm implement having a rotatable cylinder, with the mechanism arranged for varying the speed of the cylinder. The mechanism includes an expansible pulley having a disk movable in opposite directions to control the effectiveness of a belt between the pulley and a second pulley. A movable arm cooperates with the expansible pulley and the movement of the arm is controlled by a pair of gears in permanent engagement with each other and tiltable to control the direction of movement of the arm. The gears may be controlled from a point remote therefrom and remote from the other parts of the operating mechanism.

Background of the invention

The present invention relates to work devices such as, for example, a farm implement known as a combine and more particularly to an improved control mechanism for a variable ratio drive for such work devices.

In work devices, such for example as harvester-threshers or combines, it is desirable to have certain components thereof, such as a threshing cylinder, driven at selectively variable speeds to meet the varying conditions of the crops such as moisture content and the thickness of the crops and the type of crops to be harvested.

It has been previously proposed to provide control mechanism for variable speed drives on work device vehicles which were complicated and lacked adequate features to insure safety of the operation or to prevent damage to the working parts of the mechanism. These controls did not include an automatic feature to permit constant speed operation at any desired setting.

Summary of the invention

In accordance with the present invention, there is providede a control mechanism for a variable speed drive of a work device. A driving expansible pulley is connected to a second pulley through a belt for causing rotation of the second pulley. The expansible pully includes a movable disc for varying the effectiveness of the expansible pulley thereby controlling the speed of the second pulley.

A movable arm is connected with the disc and is movable by a rotatable screw which is arranged to be operated in opposite directions so that the disc may be moved in opposite directions to thus vary the effectiveness of the expansible pulley. The screw is controlled by a pair of tiltable gears which are in constant mesh with each other and may be tilted to selectively control the direction of rotation of the screw. The tilting of the gears is controlled remotely from all operating mechanism and includes provisions for automatically permitting the second pulley to rotate at a selected constant desired speed.

It is therefore an object of the present invention to provide a control mechanism for a work device which includes improved safety features.

Another object is to provide an improved control mechanism for a work device which utilizes a minimum of positive acting parts and which may be controlled remotely from the working parts of the mechanism.

Another object of my invention is to provide an improved control mechanism for a work device, such as a combine, wherein a rotatable cylinder thereof may be varied in speed or conditioned to operate at a constant selected desired speed upon releasing the conditioning mechanism to automatically continue such desired speed.

Other objects of my invention will appear in the following description and appended claims, reference being had to the accompanying drawings forming a part of this specification wherein like reference characters designate corresponding parts in the several views.

In the drawings:

FIGURE 3 is a top view of the drive arrangement as shown in FIGURE 1;

FIGURE 4 is a side view of the drive arrangement shown in FIGURE 3;

Figure 1:
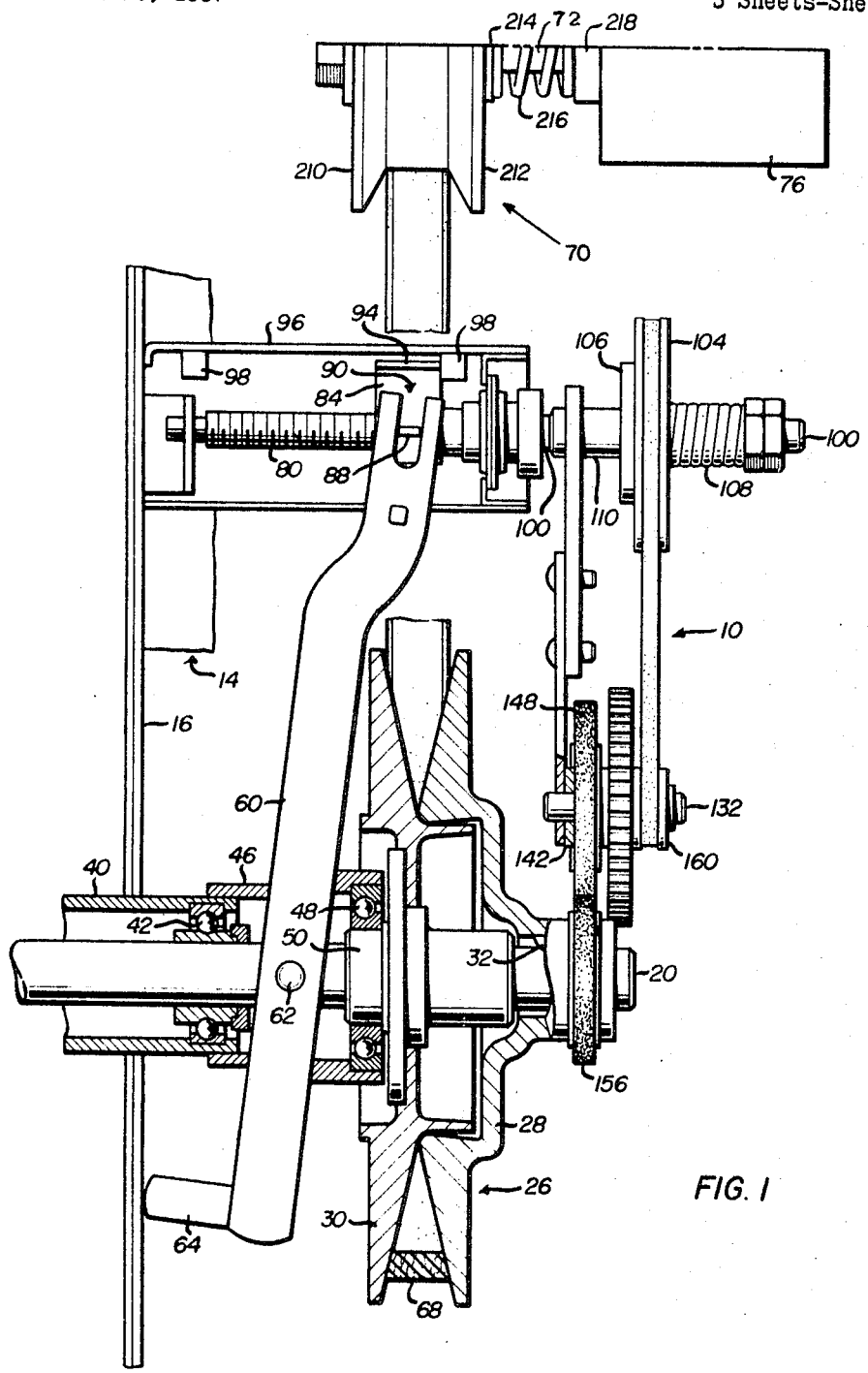
FIGURE 1 is a view in elevation and partly broken away of the control mechanism embodying features of my invention.
Figure 2:
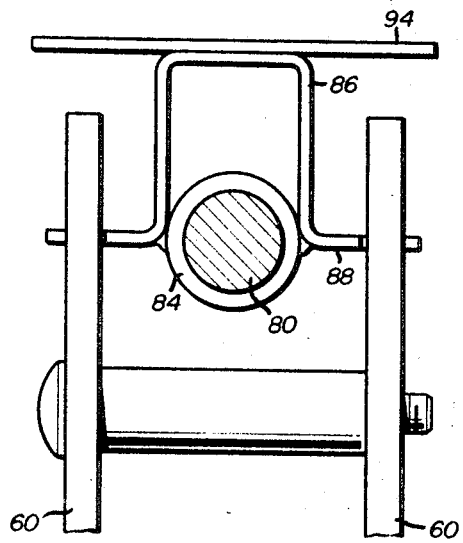
FIGURE 2 is a fragmentary side view of an arm forming a portion of the control mechanism shown in FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings the numeral 10 designates in general a control mechanism for a variable speed drive. The control mechanism is carried on a machine, such as a combine 14 having a stationary wall 16. Some portions of the combine are shown and others are not shown as they are not considered necessary to the understanding of the invention.

The control mechanism 10 is operated by a drive shaft 20 which receives its power from an engine or other power source (not shown). The control mechanism 10 comprises an expansible driving pulley 26 which includes a fixed disc 28 and a slidable disc 30. The disc 28 is fixed to the drive shaft 20 by a key 32. The disc 30 is mounted on a splined portion of the shaft 20 so that it may be slid in either direction and at the same time be rotatable with the fixed disc 28 upon rotation of shaft 20. A fixed sleeve 40 is mounted in the combine stationary wall 16 and houses a bearing 42 which supports the shaft 20. A collar or sleeve 46 carries a bearing 48 at one end thereof in which the hub 50 of the movable sheave 30 is supported. The other end of the collar 46 extends around the end of the sleeve 40. The collar 46 is movable in both directions axially of the shaft 20. The bearing 48 serves as a connection between the collar and the disc 30 so that they move in unison and the collar slides on the outer periphery of the sleeve 40.

An operating arm or lever 60 is pivoted to the collar 46 as at 62 and carries an extension 64 on the lower end thereof in engagement with the combine stationary wall 16. The arm 60 and extension 64 are used in connection with the movement of the disc 30 of the expansible pulley 26.

The expansible pulley 26 is connected by a belt 68 to a driven pulley 70 which is mounted on a shaft 72 for rotating a member such as a thresher cylinder 76. The shaft 72 may be mounted at any suitable place on the combine. According to the invention, cylinder is rotated at various speeds to take care of the work it is doing and the speed thereof is controlled by the shifting of the slidable disc 30 by controlling the diameter of the pulley 26 at the point of contact of the belt. The greater the distance between discs 28 and 30, the smaller the effective diameter of the pulley at the contact point of the belt and the slower the rotation of the cylinder 76. When the discs 28 and 30 are in closed position as shown in FIGURE 1 the belt operates on a greater diameter on pulley 26 and rotates the cylinder at its highest speed. Various speeds may be obtained between complete open and closed positions of the discs 28 and 30.

In order to pivot the operating arm 60 and move the disc 30, a screw 80 is threadedly received in a bushing or nut 84. The bushing 84 is carried by an inverted U-shaped member 86 having ears 88 received in notches 90 of the arm 60. This permits the screw 80 to be rotated in either direction to move the bushing 84 and the arm 60 in either direction. The U-shaped member 86 has a bar 94 fixed thereto for engagement with a casing 96 supported on stationary wall 16 to prevent rotation of the bushing 84. The casing 96 also has spaced limit stops 98 for engagement by the bar 94.

Means are provided for rotating the screw 80 in opposite directions. According to the invention, the means for rotating the screw 80 includes a rotatable shaft 100 connected to the screw in any conventional manner. The shaft 100 carries a pulley 104 which forms part of a slip clutch 106. The pulley and clutch are positioned between a thrust spring 108 and a bushing 110.

The pulley 104 is rotatable in opposite directions by a pair of gears 120 and 122 which are in constant mesh with each other. As shown in FIGURE 4, the gears 120 and 122 are held in neutral position and are mounted on a triangular plate 126 which is pivotally supported by a hanger 128 on the bushing 110.

The gears 120 and 122 are in constant mesh with each other and respectively mounted for rotation on shafts 130 and 132 which are supported by the plate 126. The gears 120 and 122 also have hubs 140 and 142 (FIGURE 3) on which friction wheels 146 and 148 are fixed for rotation with gears 120 and 122 respectively. Thus, pivotal movement of the plate 126 and hanger 128 to the left or right, as viewed in FIGURE 4, will cause selective engagement of one of the friction wheels with a friction wheel 156 carried on the end of the drive shaft 20. Since the shaft 20 is rotating at all times, the engagement of either friction wheel 146 or 148 with friction wheel 156 will cause gears 120 and 122 to be rotated. This rotation of the gears 120 and 122 will be transmitted through pulley 160 and belt 162 to pulley 104.

When the gears 120 and 122 are thus tilted the friction wheel 148 engages friction wheel 156 to rotate gear 122. Assuming the shaft 20 rotates in a clockwise direction, the screw 80 will be rotated in a counterclockwise direction when the gears are tilted to the left as viewed in FIGURE 3. This causes movement of the upper end of the lever 60 to the left as viewed in FIGURE 1. The force of the belt 68 will of course tend to move the movable disc 30 away from the fixed disc 28 and this force will tend to maintain the extension 64 in engagement with wall 16. Thus, the force of the belt 68 will move disc 30 from disc 28 to cause a reduced speed of the cylinder 76.

When the gears are tilted to the right the belt 162 turns the screw clockwise to move the disc 30 towards fixed disc 28 thereby increasing the speed of the cylinder 76. When the gears 120 and 122 are so tilted the friction wheel 146 engages the friction wheel 156 to rotate the gear 120 in a counterclockwise direction which in turn rotates gear 122, pulley 104 and screw 80 in a clockwise direction. This moves the bushing or nut 84 to the right along with the lever 60 at its upper end while the extension 64 engages the stationary wall 16 of the combine 12 to thus cause the collar 46 and disc to be forced to the right to close the expansible pulley 26 which causes the belt to operate on a greater radius on pulley 26 to increase the speed of the cylinder 76. When the gears 120 and 122 are in neutral position as shown in FIGURE 3 the screw does not operate.

Alternatively, the gears 120 and 122 are placed directly in alignment with the friction wheel, which is preferably of a resilient material that will prevent wearing of the gear teeth surfaces. If this method is utilized, the friction wheels 146 and 148 can be eliminated.

In order to control the operation as described, a hand lever 180 is positioned in a console 182 in a cab 186 of the combine 12 which is remote from the active gears, pulleys and other parts of the control mechanism. This lever 180 is connected to a shaft 188 rotatably supported on the console 182. The shaft 188 has one end of a rod 190 fixedly secured thereto with the opposite end pivotably connected to one end of a push rod 194. The other end of the push rod 194 is connected to the triangular plate 126 for pivoting the plate 126 while a turn-buckle 198 is provided intermediate the ends of the rod 194 to adjust the rod to its desired length.

Means are provided for maintaining triangular plate 126 in the neutral position shown in FIGURE 3. For this purpose, a yoke 202 stradles the rod 190 and has one end of a tension spring 200 connected thereto by a member 201. The opposite end of the spring is connected to the cab 186 and normally maintains the member 202 in engagement with one edge of a slot 204 in the cab floor. Thus, if the lever 180 is rotated in a clockwise direction as viewed in FIGURE 4 and subsequently released, the spring force of the spring moves the plate 126 to the neutral position. If the lever is rotated counterclockwise and subsequently released, the weight of the plate and element supported thereon will cause the plate 126 to move to the neutral position.

When the hand lever 180 is depressed, the pair of gears 120 and 122 are moved to the left by rods 190 and 194 and plate 126 to decrease the cylinder speed. When the hand lever is raised, the gears 120 and 122 move to the right to increase the cylinder speed. Release on the hand lever immediately causes the pair of gears to move to the neutral position.

By the above arrangement the hand lever 180 may be operated to obtain the desired speed of the cylinder and then released to automatically cause the pair of gears to be returned to neutral position while the cylinder continues to operate at the desired selected speed.

Of course the length of the belt 68 remains the same at all times. Thus, means must be provided for compensating for the effective diameter changes of the movable drive sheave. Preferably this is accomplished by forming the driven pulley 70 of two selections or discs 210 and 212. The disc 210 is fixed to the shaft 72 while the disc 212 is movable axially of the shaft. In the illustrated embodiment, the bearing 214 is keyed to and is movable axially of the shaft 72. A heavy compression spring 216 is interposed between the bearing 214 and a bearing 218 and tends to move the discs 210 and 212 toward each other.

Figure 5:
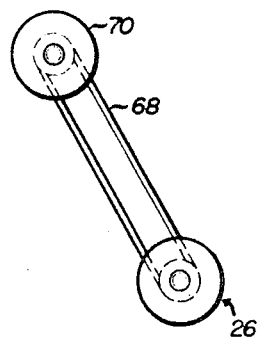
FIGURE 5 is a view of the expansible driving pulley in an intermediate position and connected to the driven pulley by a belt.
Figure 6:
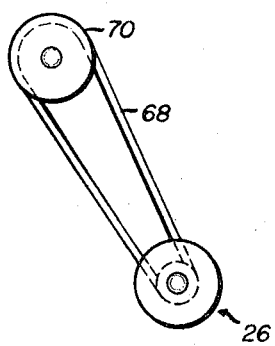
FIGURE 6 is a side view of the pulley belt arrangement when the expansible pulley is open.
Figure 7:
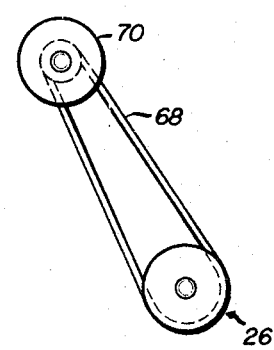
FIGURE 7 is a side view of the arrangement shown in FIGURE 6 with the expansible pulley in closed position.

In operation, as the drive sheave 26 closes to increase the effective diameter thereof, the additional tension on the belt 68 overcomes the force of spring 216, or vice versa, to move the movable disc 212 and amount equal to the movement of the disc 30. Therefore, the effective diameter of the pulley 70 is varied by an equal and opposite amount to double the speed change occasioned by the diameter change of the pulley 26. Because the two movable portions or discs 30, 212 move in the same direction at the same rates, the belt centerline moves axially of pulleys 26 and 72 at each end the same amount and the belt stays properly aligned. The intermediate minimum and maximum speed positions of the pulleys 26, 70 and belt 68 are shown in FIGURES 5, 6 and 7.

I claim:

1. Control mechanism for a variable speed drive wherein the improvement comprises a driving shaft, an expansible pulley on said shaft including a conical disc fixed to the shaft and a conical disc movable along said shaft, an arm operably connected to said disc movable along said shaft, rotatable means cooperating with said arm and adapted to move said arm in opposite directions, a rotary element carried by said driving shaft, a pair of gears in direct engagement with each other for selective rotation with said rotary element carried by said driving shaft, means carrying said gears and movable for selectively engaging said gears with said rotary element and a driving connection between one of said gears and said rotatable means to rotate the rotatable means and move said arm in one direction when the gears are rotated in one direction and to rotate the rotatable means in the opposite direction and move said arm in the opposite direction when the gears are rotated in the opposite direction to vary the effectiveness of said expansible pulley by movement of said arm.

2. A control mechanism as defined in claim 1 wherein the pair of gears in direct engagement with each other are tiltable for selective rotation with said rotary element.

3. A control mechanism as defined in claim 1 wherein the rotatable means include a bushing and a screw rotatable in opposite directions in said bushing.

4. A control mechanism as defined in claim 3 wherein a clutch is utilized to limit the movement of said screw.

5. A control mechanism as defined in claim 2, further including means normally maintaining said gears in an idle condition.

6. A control mechanism as defined in claim 1 in which said connection between the movable disc and said arm includes a collar slidably mounted on said driving shaft and connected with said movable disc and said arm is pivoted intermediate the ends thereof on said collar.

7. In a machine having a cab, a stationary wall, and a variable speed drive mechanism including a driving shaft, an expansible pulley on said shaft having a fixed conical disc on the shaft and a movable conical disc on said shaft, a driven shaft having a pulley and a belt encircling said pulleys, the improvement of means for shifting said movable disc comprising a collar slidably mounted on said driving shaft and being connected to said movable disc, an arm pivotably mounted on said collar to move said movable disc, movable means connected on one end of said arm to move said arm in opposite directions, means connected on the other end of said arm and positioned to engage said stationary wall to aid in moving said collar and said movable disc in one direction actuating means for moving said movable means and control means in the cab and connected to said actuating means.

8. A work machine as defined in claim 7 in which said actuating means includes a pair of directly engaged gears positioned to be selectively and operatively interposed between said movable means and said drive shaft.

9. A work machine as defined in claim 8 wherein said gears are tiltably mounted and include means for selectively engaging said driving shaft.

10. A work machine as defined in claim 9 in which said control means comprises a lever in said cab and means for normally maintaining said actuating means and said lever in a neutral position out of engagement with said drive shaft.

11. In a variable speed drive mechanism having a shaft rotated adjacent a stationary wall, an expansible pulley on said shaft including a fixed disc and a movable disc with means for shifting said movable disc on said shaft, the improvement of said means including an arm operatively connected to said movable disc intermediate the ends thereof, one end of said arm engaging said stationary wall, a rotatable screw spaced from and substantially parallel to said shaft, means operatively connecting the opposite end of said arm to said screw whereby rotation of said screw in opposite directions will move said arm and said movable disc in opposite directions, and means operatively interposed between said screw and said shaft for selectively rotating said screw in opposite directions to move the opposite end of said arm thereby shifting said movable disc on said shaft.

12. A variable speed drive mechanism as defined in claim 11 in which said last means includes a plate pivotally supported adjacent said screw, a pair of rotatable friction wheels mounted in spaced relation on said plate, a pair of gears in constant mesh with each other and respectively carried by said friction wheels, means operatively connecting one of said gears to said rotatable screw and control means for selectively engaging said friction wheels with said shaft whereby to rotate said screw in opposite directions.

13. A variable speed drive mechanism as defined in claim 11, in which said last means includes a pair of gears in constant mesh with each other means operatively connecting at least one of said gears to said rotatable screw and means for selectively moving said gears into engagement with said shaft whereby to rotate said screw in opposite directions.

References Cited

UNITED STATES PATENTS

| | | | |
|---|---|---|---|
| 2,600,416 | 6/1952 | Millard | 74—230. |
| 3,088,326 | 5/1963 | Woodward | 74—230. |
| 3,386,299 | 6/1968 | Brown et al. | 74—230. |

FRED C. MATTERN, Jr., Primary Examiner

JAMES A. WONG, Assistant Examiner